(12) United States Patent
Harrison et al.

(10) Patent No.: US 11,048,355 B2
(45) Date of Patent: *Jun. 29, 2021

(54) DETERMINING PITCH AND YAW FOR TOUCHSCREEN INTERACTIONS

(71) Applicant: QEEXO, CO., Mountain View, CA (US)

(72) Inventors: Christopher Harrison, Pittsburgh, PA (US); Julia Schwarz, Pittsburgh, PA (US); Robert Bo Xiao, Saskatoon (CA)

(73) Assignee: QEEXO, CO., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/660,739

(22) Filed: Jul. 26, 2017

(65) Prior Publication Data
US 2020/0125207 A1 Apr. 23, 2020

Related U.S. Application Data

(63) Continuation of application No. 14/869,998, filed on Sep. 30, 2015, now Pat. No. 9,778,783, which is a (Continued)

(51) Int. Cl.
G06F 3/041 (2006.01)
G06T 7/136 (2017.01)
(Continued)

(52) U.S. Cl.
CPC ........... G06F 3/0416 (2013.01); G06F 3/042 (2013.01); G06F 3/0414 (2013.01); G06T 7/136 (2017.01); G06T 7/73 (2017.01)

(58) Field of Classification Search
CPC .. G06F 3/0416; G06F 3/0414; G06F 3/04186; G06F 3/042; G06F 3/044; G06T 7/136; G06T 7/73
See application file for complete search history.

(56) References Cited

U.S. PATENT DOCUMENTS 8,154,529 B2 * 4/2012 Sleeman ............... G06F 3/0416
345/173
8,170,346 B2 5/2012 Ludwig
(Continued)

FOREIGN PATENT DOCUMENTS

CN 103176624 6/2013
CN 105247461 A 1/2016
(Continued)

OTHER PUBLICATIONS

Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (TABLETOP); pp. 139-146; 2008.

(Continued)

Primary Examiner — Vijay Shankar
(74) Attorney, Agent, or Firm — Kwan & Olynick LLP

(57) ABSTRACT

A method and apparatus for determining pitch and yaw of an elongated interface object as it interacts with a touchscreen surface. A touch image is received, and this touch image has at least a first area that corresponds to an area of the touchscreen that has an elongated interface object positioned at least proximate to it. The elongated interface object has a pitch and a yaw with respect to the touchscreen surface. A first transformation is performed to obtain a first transformation image of the touch image, and a second transformation is performed to obtain a second transformation image of the touch image. The first transformation differs from the second transformation. The yaw is determined for the elongated interface object based on both the first and second transformation images. The pitch is determined based on at least one of the first and second transformation images.

20 Claims, 3 Drawing Sheets

Related U.S. Application Data continuation of application No. PCT/US2015/014581, filed on Feb. 5, 2015.

(60) Provisional application No. 61/939,069, filed on Feb. 12, 2014.

(51) Int. Cl.
*G06T 7/73* (2017.01)
*G06F 3/042* (2006.01)

(56) References Cited

U.S. PATENT DOCUMENTS

| | | | |
|---|---|---|---|
| 9,013,452 | B2 | 4/2015 | Harrison |
| 9,019,244 | B2 | 4/2015 | Harrison |
| 9,052,772 | B2 | 6/2015 | West |
| 9,778,783 | B2 * | 10/2017 | Harrison .................. G06T 7/73 |
| 2004/0012573 | A1 * | 1/2004 | Morrison ............. G06F 3/0428 345/173 |
| 2005/0083313 | A1 | 4/2005 | Hardie-Bick |
| 2005/0225541 | A1 | 10/2005 | Lapstun |
| 2009/0079710 | A1 | 3/2009 | Lapstun et al. |
| 2009/0232355 | A1 | 9/2009 | Minear et al. |
| 2009/0254869 | A1 | 10/2009 | Ludwig et al. |
| 2010/0289754 | A1 * | 11/2010 | Sleeman ............... G06F 3/0416 345/173 |
| 2011/0018825 | A1 | 1/2011 | Kondo |
| 2011/0057670 | A1 | 3/2011 | Jordan |
| 2011/0169763 | A1 | 7/2011 | Westerman |
| 2011/0210943 | A1 | 9/2011 | Zaliva |
| 2011/0238613 | A1 | 9/2011 | Shehory et al. |
| 2011/0285648 | A1 | 11/2011 | Simon |
| 2012/0007821 | A1 | 1/2012 | Zaliva |
| 2012/0056846 | A1 | 3/2012 | Zaliva |
| 2012/0280927 | A1 | 11/2012 | Ludwig |
| 2013/0009896 | A1 * | 1/2013 | Zaliva .................. G06F 3/0416 345/173 |
| 2013/0038554 | A1 | 2/2013 | West |
| 2014/0240295 | A1 | 8/2014 | Harrison |
| 2014/0289659 | A1 | 9/2014 | Harrison |
| 2014/0327626 | A1 | 11/2014 | Harrison |
| 2015/0035759 | A1 | 2/2015 | Harrison |
| 2015/0242009 | A1 | 8/2015 | Xiao |
| 2016/0077615 | A1 | 3/2016 | Schwarz |
| 2016/0077664 | A1 | 3/2016 | Harrison |
| 2016/0085324 | A1 | 3/2016 | Schwarz |
| 2016/0085333 | A1 | 3/2016 | Christopher |
| 2016/0085372 | A1 | 3/2016 | Munemoto |
| 2016/0098185 | A1 | 4/2016 | Xiao |
| 2016/0224145 | A1 | 8/2016 | Harrison |
| 2016/0231865 | A1 | 8/2016 | Harrison |
| 2016/0299615 | A1 | 10/2016 | Schwarz |
| 2017/0024892 | A1 | 1/2017 | Harrison |
| 2017/0060279 | A1 | 3/2017 | Harrison |

FOREIGN PATENT DOCUMENTS

| | | |
|---|---|---|
| CN | 107710111 A | 2/2018 |
| EP | 3105664 A1 | 12/2016 |
| EP | 3317752 A1 | 5/2018 |
| JP | 2004213312 A | 7/2004 |
| KR | 20020075283 A | 10/2002 |
| WO | 2006070044 A1 | 7/2006 |
| WO | 2015123081 A1 | 8/2015 |
| WO | 2017004262 A9 | 2/2017 |

OTHER PUBLICATIONS

Dietz, Paul, Leigh, Darren; DiamondTouch: A Multi-User Touch Technology; ACM Symposium on User Interface Software & Technology (UIST); pp. 219-226; 2001.
European Patent Office Extended Search Report for EP 14 79 4212; dated Nov. 9, 2016.
European Patent Office Extended Search Report for EP 14 83 2247; dated Feb. 23, 2017.
Final Office Action—dated Aug. 26, 2016—U.S. Appl. No. 14/219,919, filed Mar. 19, 2014, titled: "Method and Device for Sensing Touch Input."
Final Office Action—dated Aug. 7, 2015—U.S. Appl. No. 14/191,329, filed Feb. 26, 2014, titled: "Using Capacitive Images for Touch Type Classification".
Final Office Action—dated Dec. 20, 2016—U.S. Appl. No. 15/073,407, filed Mar. 17, 2016, titled: "Input Tools Having Viobro-Acoustically Distinct Regions and Computing Device for Use With the Same."
Final Office Action—dated Feb. 24, 2016—U.S. Appl. No. 13/887,711, filed May 6, 2013, titled: "Using Finger Touch Types to Interact with Electronic Devices".
Final Office Action—dated Jan. 18, 2017—U.S. Appl. No. 14/684,407, filed Apr. 12, 2015, titled: "Method and Apparatus for Classifying Contacts With a Touch Sensitive Device."
Final Office Action—dated Jun. 19, 2015—U.S. Appl. No. 13/958,427, filed Mar. 23, 2013, titled: "Capture of Vibro-Acoustic Data Used to Determine Touch Types".
Final Office Action—dated Jun. 8, 2017—U.S. Appl. No. 13/887,711, filed May 6, 2013, titled: "Using Finger Touch Types to Interact With Electronic Devices."
Final Office Action—dated Mar. 17, 2017—U.S. Appl. No. 14/492,604, filed Sep. 22, 2014, titled: "Method and Apparatus for Improving Accuracy of Touch Screen Event Analysis by Use of Edge Classification."
Final Office Action—dated May 1, 2017—U.S. Appl. No. 14/834,434, filed Aug. 24, 2015, titled: "Touch Sensitive Devicewith Multi-Sensor Stream Synchronized Data."
Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.
International Search Report and Written Opinion for PCT/US2012/060865; dated Mar. 29, 2013.
International Search Report and Written Opinion for PCT/US2015/014581; dated May 14, 2015.
International Search Report and Written Opinion for PCT/US2015/047428; dated Nov. 27, 2015.
International Search Report and Written Opinion for PCT/US2015/047616; dated Jul. 1, 2016.
International Search Report and Written Opinion for PCT/US2015/050570; dated Dec. 17, 2015.
International Search Report and Written Opinion for PCT/US2015/051106; dated Jan. 28, 2016.
International Search Report and Written Opinion for PCT/US2015/051355; dated Dec. 15, 2015.
International Search Report and Written Opinion for PCT/US2015/051582; dated Feb. 26, 2016.
International Search Report and Written Opinion for PCT/US2016/040194; dated Sep. 19, 2016.
International Search Report and Written Opinion for PCT/US2016/044552; dated Oct. 17, 2016.
International Search Report and Written Opinion received for PCT Application No. PCT/US2014/033380 dated Mar. 13, 2015.
International Search Report and Written Opinion received for PCT Application No. PCT/US2014/034977 dated Sep. 18, 2014.
International Search Report and Written Opinion received for PCT Application No. PCT/US2014/049485 dated Nov. 17, 2014.
Non-Final Office Action—dated Apr. 21, 2017—U.S. Appl. No. 15/075,648, filed Mar. 21, 2016, titled: "Method and Apparatus for Differentiating Touch Screen Users Based on Touch Event Analysis."
Non-Final Office Action—dated Apr. 6, 2015—U.S. Appl. No. 13/887,711, filed May 6, 2013, titled: "Using Finger Touch Types to Interact With Electronic Devices".
Non-Final Office Action—dated Dec. 1, 2016—U.S. Appl. No. 14/486,800, filed Sep. 15, 2014, titled: "Method and Apparatus for Resolving Touch Screen Ambiguities."
Non-Final Office Action—dated Dec. 18, 2015—U.S. Appl. No. 14/483,150, filed Sep. 11, 2014, titled: "Method and Apparatus for Differentiating Touch Screen Users Based on Touch Event Analysis".

(56) References Cited

OTHER PUBLICATIONS

Non-Final Office Action—dated Dec. 30, 2015—U.S. Appl. No. 14/503,894, filed Oct. 1, 2014, titled: "Method and Apparatus for Addressing Touch Discontinuities".
Non-Final Office Action—dated Feb. 2, 2017—U.S. Appl. No. 14/191,329, filed Feb. 26, 2014, titled: "Using Capacitive Images for Touch Type Classification."
Non-Final Office Action—dated Jan. 29, 2016—U.S. Appl. No. 14/219,919, filed Mar. 19, 2014, titled: "Method and Device for Sending Touch Inputs".
Non-Final Office Action—dated Jun. 13, 2016—U.S. Appl. No. 14/751,589, filed Jun. 26, 2015, titled: "Method and Apparatus for Classifying a Touch Event on a Touch Screen as Related to One of Multiple Function Generating Interaction Layers and Activating a Function in the Selected Interaction Layer."
Non-Final Office Action—dated Mar. 13, 2015—U.S. Appl. No. 13/958,427, filed Mar. 23, 2013, titled: "Capture of Vibro-Acoustic Data Used to Determine Touch Types".
Non-Final Office Action—dated May 16, 2017—U.S. Appl. No. 14/503,894, filed Oct. 1, 2014, titled: "Method and Apparatus for Addressing Touch Discontinuities."
Non-Final Office Action—dated May 31, 2017—U.S. Appl. No. 14/612,089, filed Feb. 2, 2015, titled: "Method and System for Activating Different Interactive Functions Using Different Types of Finger Contacts."
Non-Final Office Action—dated Nov. 10, 2016—U.S. Appl. No. 13/958,427, filed Aug. 2, 2013, titled: "Capture of Vibro-Acoustic Data Used to Determine Touch Types."
Non-Final Office Action—dated Nov. 25, 2016—U.S. Appl. No. 14/495,041, filed Sep. 24, 2014, titled: "Imethod for Improving Accuracy of Touch Screen Event Analysis by Use of Spatiotemporal Touch Patterns."
Non-Final Office Action—dated Nov. 5, 2015—U.S. Appl. No. 13/887,711, filed May 6, 2013, titled: "Using Finger Touch Types to Interact with Electronic Devices".
Non-Final Office Action—dated Oct. 2, 2015—U.S. Appl. No. 14/486,800, filed Sep. 15, 2014, titled: "Method and Apparatus for Resolving Touch Screen Ambiguities".
Non-Final Office Action—dated Oct. 7, 2015—U.S. Appl. No. 14/495,041, filed Sep. 24, 2014, titled: "Method for Improving Accuracy of Touch Screen Event Analysisby Use of Spatiotemporal Touch Patterns".
Non-Final Office Action—dated Oct. 1, 2015—U.S. Appl. No. 14/492,604, filed Sep. 22, 2014, titled: "Method and Apparatus for Improving Accuracy of Touch Screen Event Analysis by Use of Edge Classification".
Olwal, Alex, Wilson, Andrew; SurfaceFusion: Unobtrusive Tracking of Everyday Objects in Tangible User Interfaces; Proceedings of GI, 2008; pp. 235-242; 2008.
Rekimoto, Jun, Sciammarella, Eduardo; ToolStone: Effective use of the Physical Manipulation Vocabularies of Input Devices: Proceedings of UIST, 2000; pp. 109-117; 2000.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Mimio; Innovative Technology in the Classroom. Downloaded and printed on Nov. 19, 2019. https://mimio.boxlight.com/.

Asano et al., "Real-Time Sound Source Localization and Separation System and Its Application to Automatic Speech Recognition", Proceedings of Eurospeech, 2001; p. 1013-1016; 2001.
Benko et al. "Sphere: Multi-Touch Interactions on a Spherical Display", Proceedings of UIST, 2008; pp. 77-86.
Burges, Christopher, "A Tutorial on Support Vector Machines for Pattern Recognition," Data Mining and Knowledge Discovery, vol. 2, Issue 2, pp. 121-167, Jun. 1998.
Deyle et al., "Hambone: A Bio-Acoustic Gesture Interface", Proceedings of ISWC, 2007, pp. 1-8.
Dietz et al., DT Controls: Adding Identity to Physical Interfaces, ACM Symposium on User Interface Software & Technology (UIST), 2005, pp. 245-252.
Gutwin et al., "Supporting Informal Collaboration in Shared-Workspace Groupware", Journal of Universal Computer Science, vol. 14, No. 9, 2008, pp. 1411-1434.
Harrison et al., "Scratch Input: Creating Large, Inexpensive, Unpowered and Mobile Finger Input Surfaces", Proceedings of UIST, 2008, pp. 205-208.
Harrison et al., Skinput: Appropriating the Body as an Input Surface, Proceedings of CHI, Apr. 10-15, 2010, pp. 453-462.
Hartmann et al., "Augmenting Interactive Tables with Mice & Keyboards", Proceedings of UIST, 2009, pp. 149-152.
Hinckley et al., "Manual Deskterity: An Exploration of Simultaneous Pen+ Touch Direct Input", Proceedings of CHI, 2010, pp. 2793-2802.
Hinckley et al., "Pen+ Touch= New Tools", Proceedings of UIST, 2010, pp. 27-36.
Hinckley et al., "Sensor Synaesthesia: Touch in Motion, and Motion in Touch", Proceedings of CHI, 2011, pp. 801-810.
Holz et al., "The Generalized Perceived Input Point Model and How to Double Touch Accuracy by Extracting Fingerprints" Proceedings of CHI, 2010, pp. 581-590.
Kaltenbrunner, M. et al., "reacTIVision: A Computer-Vision Framework for Table-Based Tangible Interaction," Proceedings of TEI, 2007, pp. 69-74.
Matsushita et al., "HoloWall: Designing a Finger, Hand, Body, and Object Sensitive Wall", Proceedings of UIST, 1997, pp. 209-210.
Non-Final Office Action dated Apr. 19, 2017 in U.S. Appl. No. 14/869,998, 7 pages.
Paradiso et al., "Tracking and Characterizing Knocks Atop Large Interactive Displays", Sensor Review, vol. 25, No. 2, 2005, pp. 134-143.
Paradiso, J. et al., "Sensor Systems for Interactive Surfaces," IBM Systems Journal, vol. 39, Issue 3-4, pp. 892-914, 2000.
Patten, James, Mcmichael., "Sensetable: A Wireless Object Tracking Platform for Tangible User Interfaces", Proceedings of CHI, 2001, pp. 253-260.
Rekimoto et al., "Augmented Surfaces: A Spatially Continuous Work Space for Hybrid Computing Environments", Proceedings of CHI, 1999, pp. 378-385.
Rekimoto et al., "SmartSkin: an Infrastructure for Freehand Manipulation on Interactive Surfaces", Proceedings of CHI, 2002, pp. 113-120.
Wang et al., "Empirical Evaluation for Finger Input Properties in Multi-Touch Interaction", Proceedings of CHI, 2009, pp. 1063-1072.

* cited by examiner

DETERMINING PITCH AND YAW FOR TOUCHSCREEN INTERACTIONS

CROSS-REFERENCE TO RELATED APPLICATION

This application is a continuation of U.S. patent application Ser. No. 14/869,998 filed on Sep. 30, 2015, titled "DETERMINING PITCH AND YAW FOR TOUCHSCREEN INTERACTIONS," which is a continuation of international application PCT/US15/14581 filed on Feb. 5, 2015, which claims the benefit of U.S. Provisional Patent Application No. 61/939,069, filed on Feb. 12, 2014, all hereby incorporated by reference as if fully set forth here.

TECHNICAL FIELD

The present invention relates generally to touchscreen apparatus and techniques for utilizing touchscreens. More particularly, it relates to mechanisms and method for analyzing image data generated from input that is received by a touchscreen interface device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The popularity of touchscreen devices, such found in many types of tablets and smartphones, has rapidly increased. Touchscreens are also being implemented with larger systems, such as laptop and desktop computers, interactive television systems, and the like. As the use of touchscreens increase in diverse number of applications, techniques for reliably using touchscreens have also grown.

Contemporary touchscreens report X/Y coordinates to operating systems, interfaces, and various applications. Certain embodiments of the present invention include providing pitch and yaw to an operating system, interface or application, in a similar fashion that X/Y position is reported today (e.g., inside of a touch event).

SUMMARY OF INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Some embodiments of the present invention may include a method for determining yaw of an elongated interface object as it interacts with a touchscreen. The method may include, from a sensor of a touchscreen, receiving a touch image that corresponds to an area of the touchscreen that has an elongated interface object positioned at least proximate to it, wherein the elongated interface object has a pitch and a yaw with respect to a surface of the touchscreen. The method may also include performing a first transformation to obtain a first transformation image of the touch image, performing a second transformation to obtain a second transformation image of the touch image, wherein the first transformation differs from the second transformation, and determining the yaw for the elongated interface object based on both the first and second transformation images.

Some embodiments of the present invention may include a system that includes a touchscreen element for sensing a touch image that corresponds to an area of the touchscreen that has an elongated interface object positioned at least proximate it, wherein the elongated interface object has a pitch and a yaw with respect to the touchscreen. The system also includes a processor and a memory, wherein the processor and memory are configured to perform the following operations: performing a first transformation to obtain a first transformation image of the touch image; performing a second transformation to obtain a second transformation image of the touch image, wherein the first transformation differs from the second transformation; determining yaw for the elongated interface object based on both the first and second transformation images; and determining pitch for the elongated interface object based on at least one of the first and second transformation images.

Some embodiments of the present invention may include a method of determining pitch and yaw of an image generated by a touchscreen in response to an elongated object in at least proximate relation to the touchscreen. The method may include generating said image; generating aggressive and relaxed transformations of the image and computing moments of intensity for the respective image transformations; computing centroids of the respective image transformations as well as theta and eigenvalues for the aggressive transformation; deriving pitch from a first eigenvalue; deriving a yaw estimate from theta; calculating a vector between the two centroids and disambiguating the yaw estimate using the vector; and employing said pitch and yaw to derive information about said elongated object in relation to said touchscreen.

Some embodiments of the present invention may include a method for deriving information about the three-dimensional relation between an elongated object and a touchscreen to which the object is sufficiently proximate to be sensed by the touchscreen. The method may include generating an image associated with said object; transforming said image based upon a plurality of different image pixel intensity threshold criteria; computing centroids of said image transformations; and calculating said information based at least in part on the resulting centroids.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
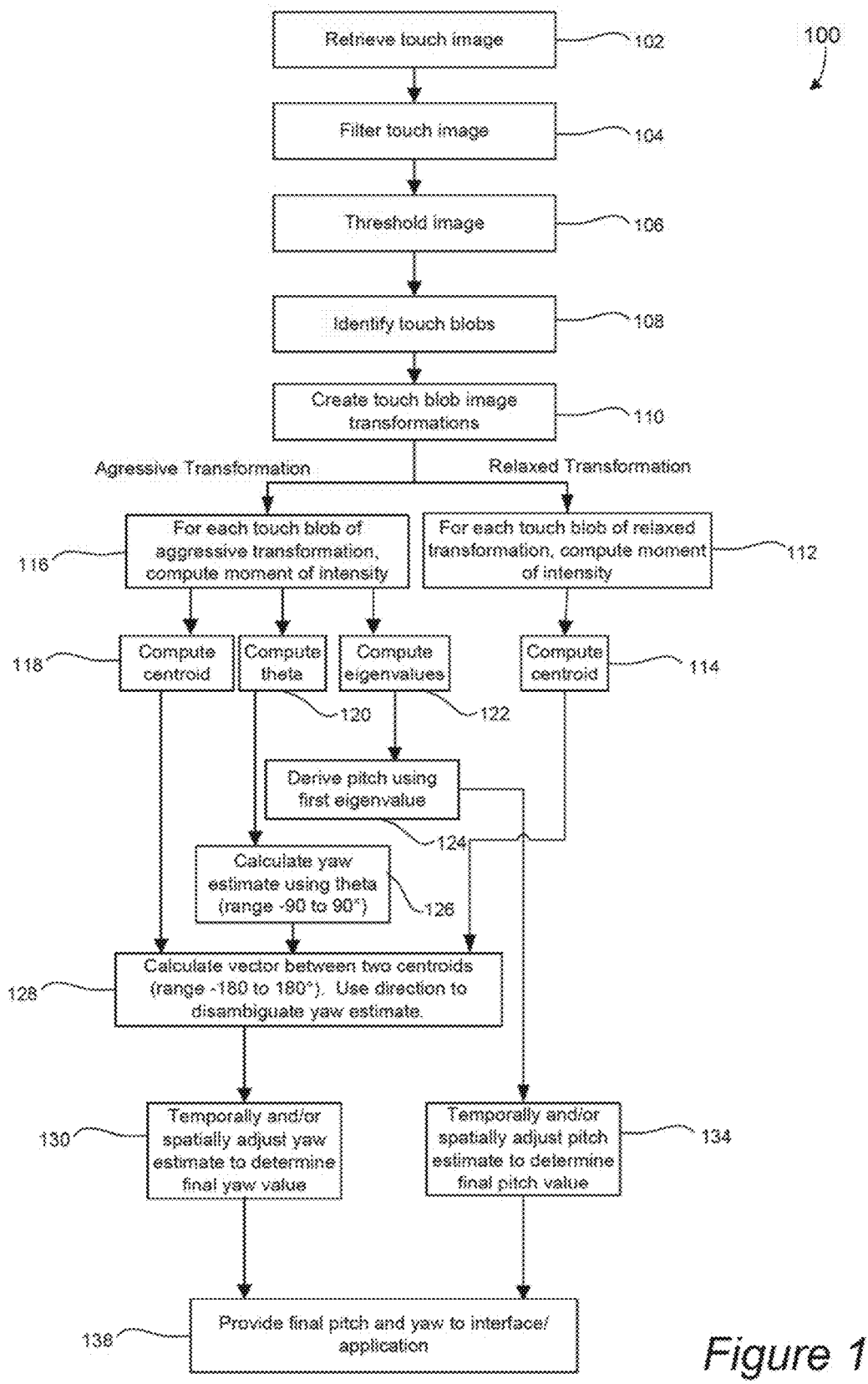
FIG. 1 is a flow chart illustrating a procedure for determining pitch and yaw of touchscreen interactions in accordance with one embodiment of the present invention.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Some embodiments of the present invention provide techniques for determining yaw of a finger, stylus, or other elongated tool as it interacts with a touchscreen interface. A touch image that is retrieved in response to the tool's interaction with the touchscreen is processed so as to extract and analyze multiple transformation images. In other words, multiple derivative touchscreen images are used to estimate yaw. In other aspects, these techniques are expanded to estimate a pitch of the elongated tool on or near a touchscreen. Any suitable techniques may be used to utilize multiple transformations of a touchscreen interaction image to determine yaw and pitch.

Some embodiments of the present invention provide techniques for determining pitch and yaw of an elongated interface object as it interacts with a touchscreen interface. Applications could use this additional touch data for various interactive uses. For example, games or maps could utilize a finger twist motion for zooming in and out of content, increasing or decreasing volume, to open up a photo for sharing or copying, or other functions. In one example, a finger can be rotated and twisted around a single point to adjust a shooting game's perspective (e.g., change angle of a gun's trajectory). Varying pitch may be used to adjust volume, change the perspective from a top-down 2D view to a ¾ths perspective 3D view, or change speed of scrolling or a game player/action. Additionally, varying pitch may be used in a binary fashion (finger flat, or perpendicular to the screen). Toggling between a flat and steep finger pitch can be used to trigger different modes, for example to switch between panning and zooming on a map when using one hand, switch between an off and on mode using one hand, etc. A touch image is received, and this touch image has at least a first area that corresponds to an area of the touchscreen that has an elongated interface object positioned proximate to and/or thereon. The elongated interface object has a pitch and a yaw with respect to the touchscreen. A first transformation is performed to obtain a first transformation image of the touch image, and a second transformation is performed to obtain a second transformation image of the touch image. The first transformation differs from the second transformation. The yaw is determined for the elongated interface object based on computation performed on the first and second transformation images.

Discrete touch locations or "blobs" may be identified. For each of these blobs the moments of the touch image intensity may then be computed. The image moment can be analogized generally to a weighted average of the pixel intensity values. Other blob information that can be computed from a blob's moment is its centroid and orientation. Using the moments, a series of image features may then be determined for each blob. For example, a centroid of an aggressive transformation may be computed. A centroid of a relaxed transformation image may also be computed. The magnitude of the first eigen value computed from the aggressive image may be used to derive a pitch estimate. Thus, the length of the blob and first eigen value can be correlated to the object pitch. In alternative embodiments, the eccentricity can be used to normalize the first eigenvalue and derive pitch, or the eccentricity can be averaged with the magnitude to obtain pitch. In other alternative embodiments, the distance between the aggressive- and relaxed-derived centroids can be used to obtain pitch.

Some embodiments of the present invention pertain to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

Touch Image Retrieval and Processing

FIG. 1 is a flow chart illustrating a procedure 100 for determining pitch and yaw of touchscreen interactions in accordance with one embodiment of the present invention. As shown, a touch image is initially retrieved in operation 102. For example, this touch image may be retrieved from a touchscreen, touch controller, sensor hub, hardware controller, and/or operating system. Several touch technologies are able to provide touch "images", which are two-dimensional spatial representations of a touchscreen's sensor data. Examples of touchscreen technologies include capacitive sensing (e.g., surface, projected, mutual- or self-capacitive), optical sensing (e.g., diffuse illumination, frustrated total internal reflection, in-pixel sensing, infrared grid, infrared acrylic projection), and force-sensitive element based screens (e.g., a pattern of force-sensitive resistors).

Figure 2A:
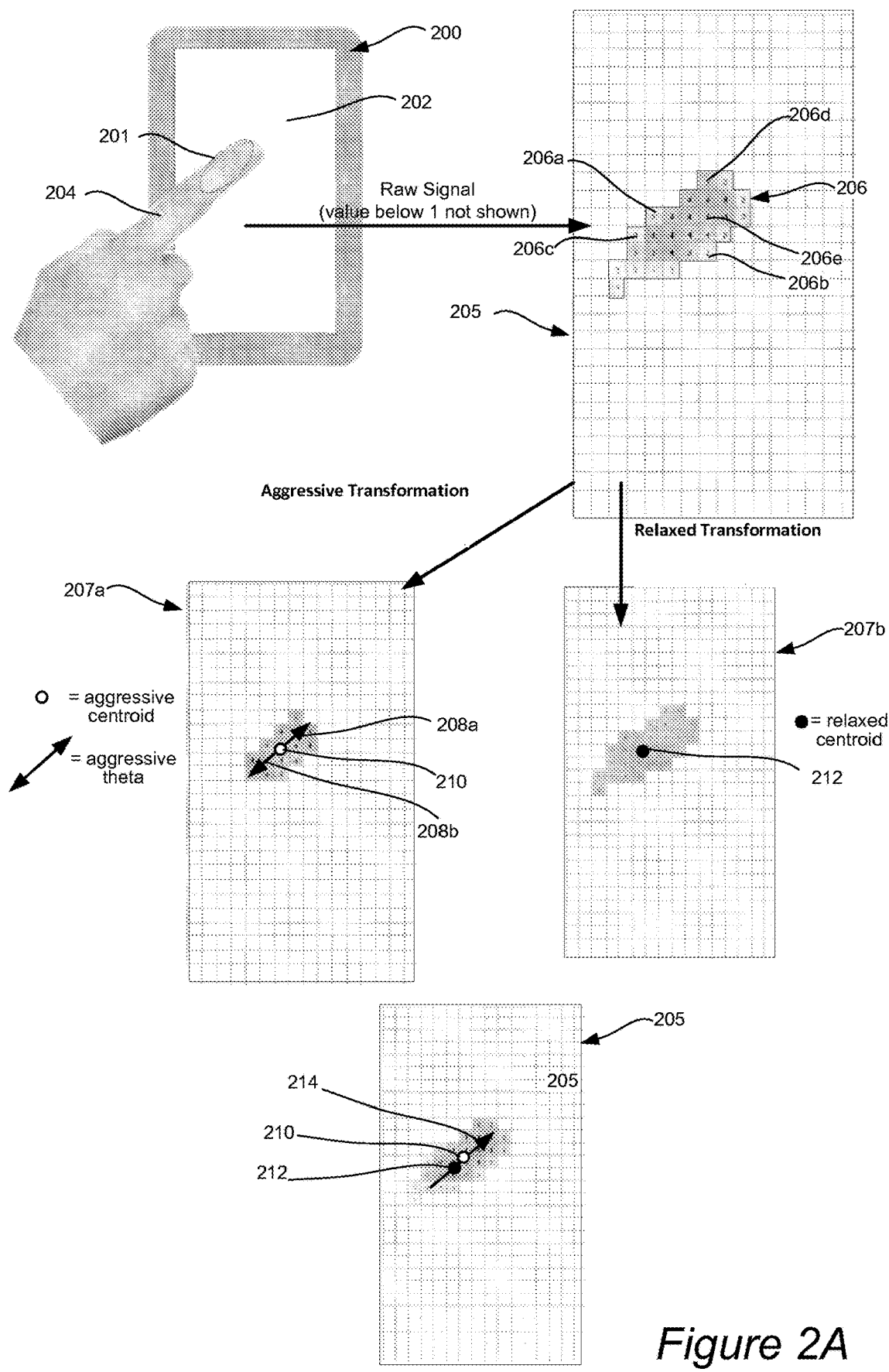
FIG. 2A includes diagrammatic representations of the touchscreen input analysis process of FIG. 1 in accordance with one embodiment of the present invention.

Regardless of technology, a touch image (or multiple images) can be obtained in response to an object, such as a finger or stylus, being positioned on or near the touchscreen's surface. Multiple touch images for multiple objects interacting with the touchscreen may be obtained simultaneously or consecutively. FIG. 2A includes diagrammatic representations of the touchscreen input analysis process of FIG. 1 in accordance with one embodiment of the present invention. As illustrated, touch image 205 is generated after a portion 201 of finger (or other tool) 204 is moved to a location that is proximate or touches the touchscreen 202 of device 200.

The touch image is generally comprised of a plurality of patches, pixels, or areas (hereby collectively referred to as pixels henceforth) that each corresponds to a different location on the touchscreen surface. Each pixel may have an intensity value that can correlate with an amount of proximity-based measurement, e.g., capacitance (or other type of intensity or proximity measurement, depending on the touchscreen technology used) resulting from an area 201 of the finger 204 touching or being located proximate to the touchscreen 202. In this example, a black color corresponds to a high amount of measured capacitance (or other signal that corresponds to object proximity/touch), while a white color corresponds to a low amount of measured capacitance. In FIG. 2A, varying gray levels correspond to a gradation of measured capacitance values that range between these two extremes.

The pixels can also be associated with a variety of intensity scales, such as 0-200 with 0 being no contact and 200 being the most contact between the object and the touchscreen, or 0.0 being no contact and 1.0 being most contact. Of course, these scales and color associations are arbitrary and any other scales or colors can be associated with different degrees of contact between the object and the touchscreen. For instance, lighter gray pixels 206a~206c (having value 2) correspond to portions of the finger area 201 which are merely hovering over, as opposed to touching, the touchscreen 202. Darker pixels 206d and 206e (having values 3 and 4) correspond to portions of the finger area 201 that are actually contacting the touchscreen 202.

The raw touch image 205 can also be optionally smoothed (e.g., spatially or temporally) to suppress unwanted, intermittent noise in any suitable manner. Referring back FIGS. 1 and 2, the touch image may be filtered in operation 104. For example, a plurality of image frames may be averaged together so as to average out or smooth the image. One example smoothing technique is to use an exponentially weighted moving average. An additional optional step is to threshold the touch image in operation 106 so as remove extraneous pixels that do not really correspond to actual locations of an object touching or being proximate to the touchscreen. For instance, values below a certain value may be removed (e.g., set to zero). In the illustrated example, all pixel intensities below 1 are filtered from the touch image 205. The threshold value may be determined through experimental data to determine which intensity values are likely to correspond to false touch points for any given touchscreen technology and/or device, as well as different users or environments.

Discrete touch locations or "blobs" may be identified in operation 110. For example, if two fingers are touching the screen, there would be two regions of the touch images that would be identified as blob areas that correspond to capacitive (or other touch measurement) activation. As shown in FIG. 2A, blob 206 is identified in touch image 205. Any suitable technique for identifying discrete activated image areas may be utilized. One technique includes analyzing the touch coordinates (in screen pixels) reported by the touchscreen controller or sensor and then mapping these coordinates to the pixels of the touch image. For each touch coordinate, a flood fill operation (also known as a "seed fill") can be used so that only activated touch pixels allow the flood to continue, resulting in an contiguous region containing only active touch pixels. In general, a blob can be identified by defining an outline around the outermost pixels. Another technique that allows the identification or segmentation of touch blobs is called connected components labeling (also known as connected-component analysis, blob extraction, region labeling, blob discovery, or region extraction). The result of this operation 108 is a "blob" of touch pixels contained within a bounding box (206) for each touch location.

Touch Blob Transformations

A plurality of transformations may be performed for each identified blob. For instance, multiple touch blob image transformations are created in operation 110. In general, two or more transformations are performed so as to result in different centroids for later disambiguating the yaw as further described below.

One possible transformation is to apply a new level of thresholding to the blob image. Another possible transformation is to binarize the blob image. For example, all pixels above a certain value are set to 1, and all other pixels are set to 0. Another possible blob transformation is to apply a log transform to all touch pixel values. Other mathematical operations are possible (e.g., square root, squared, addition, subtraction, etc.). It is also possible to apply a variety of convolutions to the touch image, such as a Gaussian blur.

In the illustrated example, the blob image is transformed into two new transformation representations: an aggressive transformation image 207a and a relaxed transformation image 207b. In general, the aggressive transformation more aggressively favors higher intensity values (e.g., high capacitive response values), while the relaxed transformation is more relaxed and includes a wider range of intensity values (e.g., difference capacitive response values) and also flattens the blob so that all pixels are equally weighted.

One example of an aggressive transformation is to take the raw touchscreen data and simply set all values below some threshold to zero. This technique yields a conservative blob segmentation result, weighing most heavily the intense (e.g., central) pixels. As shown, the aggressive transformation image transforms pixels having an intensity value below 3 to a 0 value, while maintaining the pixels equal to or greater than 3 at their current value. This transformation filters less intense pixels while maintaining peaks and valleys in the higher intensity values. The threshold for this aggressive transformation may be selected based on any suitable factor, such as which values tend to result in a centroid that only includes the innermost and highest activated touch pixels. Further, it can be calibrated against its relaxed transformation counterpart so as to produce significantly different centroid estimations for objects that are not perpendicular to the screen surface.

In a relaxed transformation example, all intensity values below a predefined threshold are set to zero, while all values above the predefined threshold are set to a common value, regardless of their magnitude. Moreover, in contrast to the aggressive transformation, the threshold is typically set to be lower. This relaxed strategy allows for lesser-activated pixels (which tend to surround touch contacts or result from being proximate to an object, but not physically in contact with each other) to be included in the blob image. Additionally, because all values greater than the threshold are set to a common value, pixels are weighted equally (i.e., without this, central pixels tend to have higher values). That is, the peaks and valleys are removed by setting most pixels to a same value (while zeroing out very low values). The relaxed transformation image 207b is the result of transforming intensity values that are equal or higher than 1.0 to a value of 1.0, while transforming all other pixels to a value of 0. The threshold for this relaxed transformation may be selected based on any suitable factor, such as which threshold tends to result in a more generous inclusion of pixels, especially relative to the aggressive transformation (e.g., the relaxed transformation is more inclusive than the aggressive threshold).

The following operations are described with respect to being performed on a single blob. However, it is understood that each blob may be processed as described below to determine pitch and yaw for multiple objects on or adjacent to the touchscreen.

Calculating Features

For each of these blob transformations the moments of the touch image intensity may then be computed. The image moment can be analogized generally to a weighted average of the pixel intensity values. Mathematically, a moment can be defined as a quantitative measure of a set of point characteristics, such as intensity values. For example, the "second moment", or more specifically the "second central moment" measures the "width" (in a particular sense) of a set of points in one dimension, or in higher dimensions measures the shape of a cloud of points as it could be fit by an ellipsoid. Other moments describe other aspects of a distribution such as how the distribution is skewed from its mean. Any distribution can be characterized by a number of features (such as the mean, the variance, the skewness, etc.), and the moments of a random variable's probability distribution are related to these features. The probability distribution itself can be expressed as a probability density function, probability mass function, cumulative distribution function, characteristic function, or moment-generating function.

Other blob information that can be computed from a blob's moment is its centroid and orientation. As shown, a moment of intensity for each blob of the aggressive transformation may be computed in operation 116. A moment of intensity for each blob of the relaxed transformation may be computed in operation 112.

Raw image moments for a two dimensional image with pixels having intensity values I(x,y) may be defined by:

$$M_{ij} = \Sigma_x \Sigma_y x^i y^j I(x,y) \quad \text{Equation[1]}$$

Similarly, the central moments of a digital image may be defined by:

$$\mu_{pq} = \Sigma_x \Sigma_y (x-\bar{x})^p (y-\bar{y})^q f(x,y) \quad \text{Equation[2]}$$

Using the moments, a series of image features may then be determined for each blob. For example, a centroid of the aggressive transformation may be computed in operation 118. A centroid of the relaxed transformation image may also be computed in operation 114. The centroid is generally defined as the weighted center of the transformed blob. For example, a pixel with a value of 4 will have 4 times the value of a pixel with a value of 1. Since all pixels of the relaxed transformation image are equally weighted, the centroid is the geometric center of the blob. The aggressive transformed blob, in contrast, will have a centroid that is weighted towards the higher value pixels (e.g., corresponding to the higher capacitive response portion). The centroid of intensity for each transformed blob image may be computed as:

$$\{\bar{x}, \bar{y}\} = \left\{ \frac{M_{10}}{M_{00}}, \frac{M_{01}}{M_{00}} \right\} \quad \text{Equation [3]}$$

For the aggressive transformation image, a theta value of the image intensity may also be computed in operation 120. Theta or the orientation of the blob may be determined by first determining the second order central moments in Equations [4]-[6] to construct a covariance matrix in Equation [7]:

$$\mu'_{20} = \frac{\mu_{20}}{\mu_{00}} = \frac{M_{20}}{M_{00}} - \bar{x}^2 \quad \text{Equation [4]}$$

$$\mu'_{02} = \frac{\mu_{02}}{\mu_{00}} = \frac{M_{02}}{M_{00}} - \bar{y}^2 \quad \text{Equation [5]}$$

$$\mu'_{11} = \frac{\mu_{11}}{\mu_{00}} = \frac{M_{11}}{M_{00}} - \bar{x}\bar{y} \quad \text{Equation [6]}$$

-continued $$cov[I(x,y)] = \begin{bmatrix} \mu'_{20} & \mu'_{11} \\ \mu'_{11} & \mu'_{02} \end{bmatrix} \quad \text{Equation [7]}$$

The eigenvectors of this matrix correspond to the major and minor axes of the image blob, so the orientation or theta can be extracted by the eigenvector associated with the largest eigenvalue by:

$$\theta = \frac{1}{2}\arctan\left(\frac{2\mu'_{11}}{\mu'_{20} - \mu'_{02}}\right) \quad \text{Equation [8]}$$

Eigenvalues for the aggressive transformation image may also be computed in operation 122. For example, the eigenvalues of the covariance matric of Equation [7] above can be represented as follows:

$$\lambda_i = \frac{\mu'_{20} - \mu'_{02}}{2} \mp \frac{\sqrt{4\mu'^2_{11} + (\mu'_{20} - \mu'_{02})^2}}{2} \quad \text{Equation [9]}$$

As illustrated in the example of FIG. 2A, an aggressive centroid 210 and theta having two directions 208a and 208b has been computed for the aggressive transformation image 207a. Likewise, a relaxed centroid 212 is determined for the relaxed transformation image 207b.

Calculating Pitch

Figure 2B:
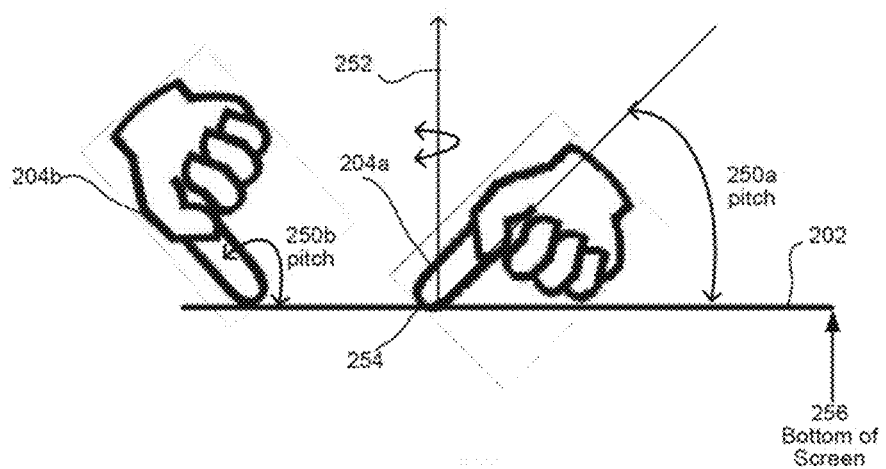
FIG. 2B illustrates a side view of pitch and yaw of a finger with respect to a touchscreen.

The magnitude of the first eigenvalue computed from the aggressive image may be used to derive a pitch estimate. In the illustrated embodiment, the first eigenvalue is used to derive pitch in operation 124. This first eigenvalue generally corresponds to the longest dimension of the blob. In general, blobs can be defined as having two dimensions, typically a width and a height. If the width of a blob is larger than its height, the first eigenvalue corresponds to the blob width. FIG. 2B illustrates pitch 250a for a finger 204a that is touching screen 202. If the finger was normal to the screen surface, the pitch would be 90°, while a finger flatted on the screen surface would have a 0° pitch. If the device or interface orientation is known, it is also possible to exceed 90° by having the finger rotate beyond perpendicular. As shown, finger 204b has a pitch 250b that exceeds 90°—this can be calculated when the bottom of the interface 256 is known. In general, both pitch and yaw may be determined relative to an origin position of the device, screen, or interface graphics and text (e.g., the interface objects that are shown in the display).

As the finger moves from a normal angle towards the surface (e.g., has a more acute pitch), the finger will tend to flatten out more and result in a longer blob and higher magnitude of the first eigenvalue. Thus, the length of the blob and first eigenvalue can be correlated to the object pitch.

In alternative embodiments, the eccentricity can be used to normalize the first eigenvalue and derive pitch, or the eccentricity can be averaged with the magnitude to obtain pitch. In general, the eccentricity is a measure of the ratio of the minor and major axis' (or longest and shortest radii) of the blob.

In other alternative embodiments, the distance between the aggressive- and relaxed-derived centroids can be used to obtain pitch.

One or more techniques may be used to temporally or spatially adjust the pitch estimate to determine a final pitch value in operation 134. Multiple pitch determinations may be averaged together to get a more stable or more accurate result. Additionally, an estimated pitch value may be adjusted according to a pre-recorded or predefined calibration curve. For example, ground truth or experimental pitch data can be collected from test users and used to calculate a regression curve that can be used to map the initial pitch estimate to a more refined finger pitch value. Other calibration data from other test objects, such as a stylus, may also be used to calculate regression curves for use of calibrating pitch for other types of objects, such as a stylus. Additionally, ground truth data can be captured for test users with different finger sizes, and used to calculate a regression curve, mapping finger size to a pitch scaling coefficient for different finger sizes. The magnitude of the first eigenvector can also be normalized against the magnitude of the second eigenvector to mitigate differences in user finger size.

Calculating Yaw

The theta value, which was computed for each aggressive transformation image blob, may be used to provide a basic estimate of yaw for each blob in operation 126. This yaw estimate corresponds to image intensity orientation for each blob. However, this intensity orientation is insufficient to determine finger yaw alone, as theta values only have a range of 180 degrees, which means that the theta value is bidirectional (e.g., theta directions 208a and 208b). Thus, the estimated finger yaw has ambiguity. For instance, a theta of 40 degrees implies a finger could have a yaw of 40 degrees or 220 degrees (e.g., there is ambiguity to which way the finger is truly pointing). For instance, two different opposite finger orientations can result in a similar blob shape and orientation.

FIG. 2B illustrates the pitch and yaw of a finger 204 with respect to touchscreen 202. The yaw may be determined with respect to the rotational angle around axis 252. If the finger 204 has a yaw of 40 degrees, this absolute yaw position cannot be calculated from the theta value alone (described in previous section). In the corresponding aggressive image 207a of FIG. 2A, the calculated theta can be computed to the same value for both a finger coming from the left bottom of the screen (208b) and a finger coming from the right top of the screen (208a).

Certain embodiments of the present invention resolve the theta angle ambiguity. For example, a finger yaw estimate spanning all 360 degrees can be provided. In the illustrated example process, two centroids 210 and 212 were determined for two transformations of the blob image (an aggressive and relaxed version). For finger touches that are perpendicular to the touchscreen, the centroids will largely converge at the same point (±some error). However, when the finger is not perpendicular to the touchscreen, the centroids spread apart, generally aligned along the major axis of the blob image intensities. The flatter the pitch, the more divergent the centroids, due to different transformation strategies. Any suitable transformations that result in two different centroids may be used.

In the illustrated embodiment, a vector is calculated between the two centroids and the vector direction is used to disambiguate the yaw estimate in operation 128. In one implementation, a centroid vector (214) is created between the aggressive and relaxed blob image centroids. As shown in FIG. 2A, centroid vector 214 is formed from the relaxed centroid 212 to the aggressive centroid 210. That is, the direction of the centroid vector 214 is defined as passing from the relaxed centroid 212 and then through the aggressive centroid 210.

Though coarse, this centroid vector 214 tends to provide a true finger yaw or direction (spanning 0-360 degrees). This centroid vector can be used as an estimate of yaw. However, the results are often noisy for an object, such as a finger. Rather than using this raw centroid vector value 214, an alternative method uses this centroid vector 214 to disambiguate the yaw (208a and 208b) that was determined from the aforementioned theta value calculated previously (e.g., the aggressive blob transformation's theta). That is, the centroid vector may be used to choose one of the two possible ambiguous directions that can correspond to theta (208a or 208b). This can be done by using the minimum angular distance to the centroid vector as a way to select one of the two directions suggested by theta. As shown, direction 208a is selected based on the centroid vector 214. The result of this process is a true 0-360 degree finger yaw estimate. The yaw estimate for each touch blob can optionally be temporally and/or spatially adjusted in operation 130, for example, to help increase stability and mitigate noise or calibrate the signal based on any suitable technique, such as the techniques described above with respect to pitch.

Pass Values to User Interfaces/Applications

Contemporary touchscreens report X/Y coordinates to operating systems, interfaces, and various applications. Certain embodiments of the present invention include providing pitch and yaw to an operating system, interface or application in operation 138, for example, in a similar fashion that X/Y position is reported today (e.g., inside of a touch event).

Applications could use this additional touch data for various interactive uses. For example, games or maps could utilize a finger twist motion for zooming in and out of content, increasing or decreasing volume, to open up a photo for sharing or copying, or other functions. In a specific example, a finger can be rotated and twisted around a single point to adjust a shooting game's perspective (e.g., change angle of a gun's trajectory). Varying pitch may be used to adjust volume, change the perspective from a top-down 2D view to a ¾ths perspective 3D view, or change speed of scrolling or a game player/action.

Additionally, varying pitch may be used in a binary fashion (finger flat, or perpendicular to the screen). Toggling between a flat and steep finger pitch can be used to trigger different modes, for example to switch between panning and zooming on a map when using one hand, switch between an off and on mode using one hand, etc.

The disclosed techniques of the present invention may be implemented in any suitable combination of software and/or hardware system that utilizes a touchscreen device that is arranged to receive one or more touches from an interactive object, such as a finger or stylus. Examples include tablets, smartphones, smartwatches, personal digital assistants (PDAs), interactive television systems, etc. An apparatus for implementing one or more portions of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 3:
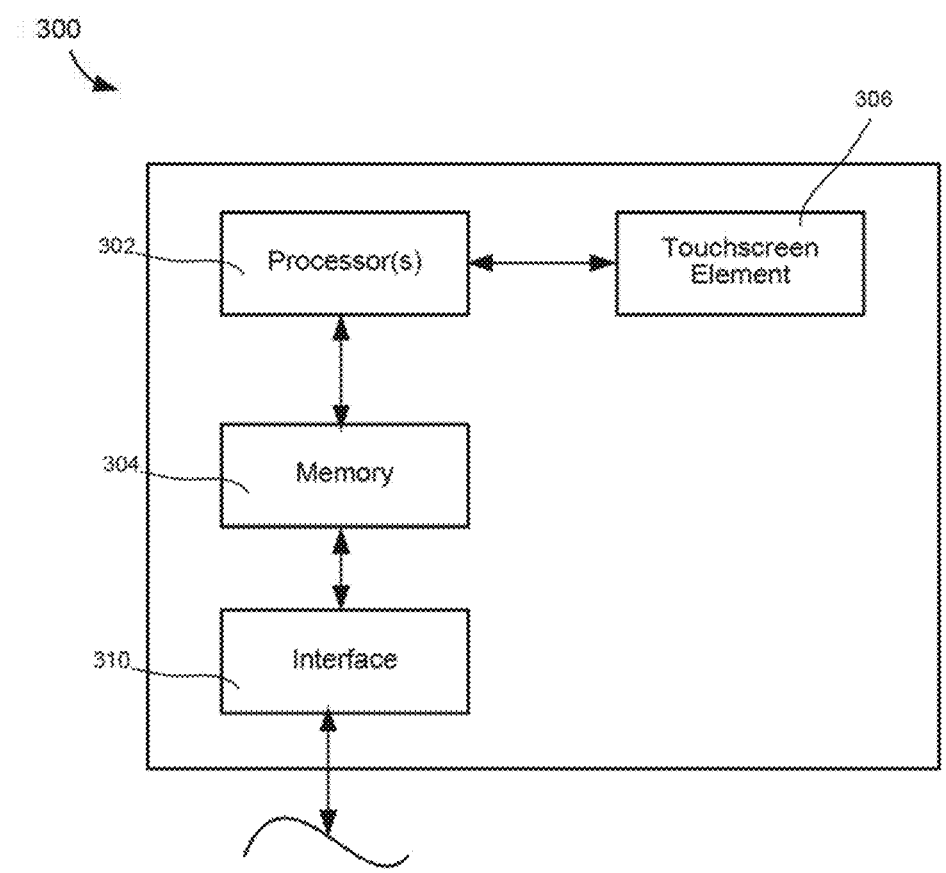
FIG. 3 illustrates a typical system that, when appropriately configured or designed, can serve as a system for implementing the process embodiments described herein.

FIG. 3 illustrates a typical computer system that, when appropriately configured or designed, can serve as a touchscreen system for implementing at least portions of the process embodiments described herein. The device 300 includes a touchscreen element 306, which includes the touchscreen, drivers, and touchscreen controllers and sensors.

The system 300 also includes any number of processors 302 (also referred to as central processing units, or CPUs) that are coupled to one or more memory devices 304, (typically a random access memory, a read only memory, etc.). CPU 302 may be of various types including microcontrollers and microprocessors such as programmable devices (e.g., CPLDs and FPGAs) and unprogrammable devices such as gate array ASICs or general-purpose microprocessors. Memory 304 may include any suitable computer-readable media such as those described herein.

CPU 302 may also be coupled to an interface 310 that connects to one or more input/output devices such as such as video monitors or displays, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 302 optionally may be coupled to an external device such as a database or a computer or telecommunications network using an external connection. With such a connection, it is contemplated that the CPU might receive information from the network, or might output information to the network in the course of performing the method steps described herein. CPU 302 may also be coupled with any other suitable internal devices, such as a GPS device or NFC device.

Embodiments of the present invention may be implemented in any suitable network systems. The network may take any suitable form, such as a wide area network or Internet and/or one or more local area networks (LAN's). The network may be in the form of a data, mobile, cellular, plain old telephone network (POTN), or any combination thereof.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

A network may also include mass storage, such as network attached storage (NAS), a storage area network (SAN), or other forms of computer or machine readable storage media, for example. Regardless of the system's configuration, it may employ one or more memories or memory modules configured to store data, program instructions and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A system comprising:
    a touchscreen element for sensing a touch image that corresponds to an area of the touchscreen that has an elongated interface object positioned at least proximate it, wherein the elongated interface object has a pitch and a yaw with respect to the touchscreen; and
    a processor and a memory, wherein the processor and memory are configured to perform the following operations:
        performing a first transformation to obtain a first transformation image of the touch image;
        performing a second transformation to obtain a second transformation image of the touch image, wherein the first transformation differs from the second transformation;
        determining a first centroid from the first transformation;
        determining a second centroid from the second transformation, wherein the first centroid differs from the second centroid if the elongated interface object is not perpendicular to the surface of the touchscreen;
        determining yaw for the elongated interface object based on both the first and second centroids; and
        determining pitch for the elongated interface object based on at least one of the first and second transformation images.

2. A method of determining pitch and yaw of an image generated by a touchscreen in response to an elongated object in at least proximate relation to the touchscreen; the method comprising:
generating said image;
generating aggressive and relaxed transformations of the image and computing moments of intensity for the respective image transformations, wherein the moments of intensity for the respective image transformations differ from each other if the elongated interface object is not perpendicular to the surface of the touchscreen;
computing centroids of the respective image transformations as well as theta and eigenvalues for the aggressive transformation, and wherein the centroids of the respective image transformations differ from each other if the elongated interface object is not perpendicular to the surface of the touchscreen;
deriving pitch from a first eigenvalue;
deriving a yaw estimate from theta;
calculating a vector between the two centroids and disambiguating the yaw estimate using the vector; and
employing said pitch and yaw to derive information about said elongated object in relation to said touchscreen.

3. The method of in claim 2, wherein said aggressive transformation of the image recognizes only higher intensity image pixels.

4. The method of in claim 2, wherein said relaxed transformation of the image recognizes both higher and lower intensity image pixels.

5. The method of claim 2, wherein the aggressive transformation includes transforming to zero pixels that have an intensity value below a first threshold, and leaving the pixels that are above the first threshold at their original intensity values, wherein the relaxed transformation includes transforming any pixels having an intensity value above a second threshold to a first value and transforming to zero any pixels having an intensity value below the second threshold, wherein the second threshold is lower than the first threshold.

6. The method of claim 2, further comprising determining pitch based on distance between first and second centroids.

7. The method of claim 2, wherein the yaw is determined by the angle of the vector between first and second centroids.

8. A method for deriving information about a three-dimensional relation between an elongated interface object and a touchscreen to which the object is sufficiently proximate to be sensed by the touchscreen, the method comprising:
generating an image associated with said object;
transforming said image into a plurality of image transformations based upon a plurality of different image pixel intensity threshold criteria;
computing centroids of said image transformations, wherein such centroids differ from each other if the elongated interface object is not perpendicular to the surface of the touchscreen; and
calculating said information about the three-dimensional relation based at least in part on the resulting centroids.

9. The method of in claim 8, wherein at least one of said centroids is based upon only higher intensity image pixels.

10. The method of in claim 8, wherein at least one of said centroids is based upon both higher and lower intensity image pixels.

11. The method of in claim 8, wherein yaw of the object is part of the derived information relative to said touchscreen.

12. The method of in claim 8, wherein pitch of the object is part of the derived information relative to said touchscreen.

13. A method for determining yaw of an elongated interface object as it interacts with a touchscreen, the method comprising:
from a sensor of a touchscreen, receiving a touch image that corresponds to an area of the touchscreen that has an elongated interface object positioned at least proximate to it, wherein the elongated interface object has a pitch and a yaw with respect to a surface of the touchscreen;
performing a first transformation to obtain a first transformation image of the touch image;
performing a second transformation to obtain a second transformation image of the touch image, wherein the first transformation differs from the second transformation;
determining a first centroid from the first transformation;
determining a second centroid from the second transformation, wherein the first centroid differs from the second centroid if the elongated interface object is not perpendicular to the surface of the touchscreen; and
determining the yaw for the elongated interface object based on both the first and second centroids.

14. The method of claim 13, wherein the yaw is determined by:
determining a theta value from the first transformation image, wherein
the yaw is further based on the theta value.

15. The method of claim 14, wherein the first transformation is an aggressive transformation that favors strongly activated touch pixels and the second transformation is a relaxed transformation that is more inclusive of touch pixels.

16. The method of claim 15, wherein the aggressive transformation includes transforming to zero pixels that have an intensity value below a first threshold, and leaving the pixels that are above the first threshold at their original intensity values, wherein the relaxed transformation includes transforming any pixels having an intensity value above a second threshold to a first value and transforming to zero any pixels having an intensity value below the second threshold, wherein the second threshold is lower than the first threshold.

17. The method of claim 15, wherein the yaw is determined by:
determining an estimated yaw that has a theta vector that corresponds to first and second possible directions based on the theta value;
determining a vector between the first and second centroids; and
selecting the first or second possible direction of the theta vector for the yaw based on the vector between the first and second centroids, wherein the first and second transformations are selected to result in the first centroid differing from the second centroid if the elongated interface object is not perpendicular to the surface of the touchscreen.

18. The method of claim 17, further comprising determining pitch based on distance between the first and second centroids.

19. The method of claim 15, wherein the yaw is determined by the angle of the vector between the first and second centroids.

20. The method of claim 13, further comprising determining the pitch for the elongated interface object based on a magnitude of at least first eigenvalue of at least one of the first and second transformation images.

* * * * *

UNITED STATES PATENT AND TRADEMARK OFFICE
CERTIFICATE OF CORRECTION

PATENT NO. : 11,048,355 B2
APPLICATION NO. : 15/660739
DATED : June 29, 2021
INVENTOR(S) : Harrison et al.

Page 1 of 1

It is certified that error appears in the above-identified patent and that said Letters Patent is hereby corrected as shown below:

On the Title Page

Item (63), continued on page 2, Lines 1 and 2, should read as follows:
(63) This application is a continuation U.S. Patent Application 14/869,998, filed Sep. 30, 2015, which is a continuation of PCT/US15/14581 filed on Feb. 5, 2015, which claims the benefit of priority of U.S. Provisional Application No. 61/939,069, filed Feb. 12, 2014.

Page 2, Column 1, item (60), delete the following:
"(60) Provisional application No. 61/939,069, filed on Feb. 12, 2014."

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*